(12) United States Patent
Cobb et al.

(10) Patent No.: US 7,297,266 B2
(45) Date of Patent: Nov. 20, 2007

(54) APPARATUS FOR SEPARATING PARTICULATES FROM A FLUID STREAM

(75) Inventors: Daniel P. Cobb, Portland, ME (US); Vaikko P. Allen, II, Portland, ME (US); John E. Richardson, Blue Hill, ME (US); David R. Charlton, Saco, ME (US); Derek M. Berg, Old Orchard Beach, ME (US)

(73) Assignee: Contech Stormwater Solutions Inc., West Chester, OH (US)

( * ) Notice: Subject to any disclaimer, the term of this patent is extended or adjusted under 35 U.S.C. 154(b) by 320 days.

(21) Appl. No.: 11/017,415

(22) Filed: Dec. 20, 2004

(65) Prior Publication Data

US 2005/0145555 A1 Jul. 7, 2005

Related U.S. Application Data

(63) Continuation-in-part of application No. 10/664,376, filed on Sep. 17, 2003, now Pat. No. 6,991,114.

(51) Int. Cl.
*B01D 21/00* (2006.01)
*B01D 21/02* (2006.01)

(52) U.S. Cl. .................. 210/305; 210/519; 210/532.1

(58) Field of Classification Search ............. 210/512.1, 210/513, 519, 521, 532.1, 295, 299, 305
See application file for complete search history.

(56) References Cited

U.S. PATENT DOCUMENTS 1,424,197 A   8/1922   Gebhard (Continued)

FOREIGN PATENT DOCUMENTS

AU   2002301132   2/2002

(Continued)

OTHER PUBLICATIONS

Decool, J., Un separateur lamellaire vertical pour l'epuration des eaux de ruissellement, L'Eau, L'Industrie, Les Nuisances, Oct. 1983, pp. 55-57, No. 77, Societe P. Johanet.

(Continued)

*Primary Examiner*—Fred G. Prince
(74) *Attorney, Agent, or Firm*—Thompson Hine LLP

(57) ABSTRACT

A screen apparatus for improved separation of particulates from a fluid stream. The screen is configured and arranged to filter relatively large particulates from the fluid stream as the fluid stream passes from a storage chamber of the tank to a tank outlet. The screen is removably affixed to a diverter, such as a baffle, used to divert a portion or all of the fluid into the storage chamber. The screen is preferably shaped to substantially conform to the shape of the diverter to aid in the smoothing of the fluid flow within the retention section of the tank. The screen may be entirely porous, or it may be non-porous at its leading edge to minimize particulate build-up at the transition from the tank interior wall to the screen. The apparatus may optionally include a second screen to provide additional filtering of floating particulates as the fluid level in the tank exceeds the crown elevation of the inlet. The second screen may be substantially horizontally oriented and may be combined with a collection weir. Alternatively, the second screen may be conical in shape. A high flow bypass arrangement for the separation system may include an upper baffle and a lower baffle or a screen instead of the lower baffle. The upper baffle is set closer to the center of the tank than the lower baffle or screen, thereby providing more volume for flow diversion behind the upper baffle.

54 Claims, 12 Drawing Sheets

U.S. PATENT DOCUMENTS

| | | | |
|---|---|---|---|
| 1,468,906 A | 9/1923 | Inman | |
| 1,809,429 A | 6/1931 | Sturgis | |
| 2,034,242 A | 3/1936 | Mautner | |
| 3,363,764 A | 1/1968 | Whitaker | |
| 3,385,444 A | 5/1968 | Dufournet | |
| 3,642,129 A | 2/1972 | McDaniel et al. | |
| 3,655,048 A * | 4/1972 | Pergola | 210/608 |
| 3,741,393 A | 6/1973 | Estes et al. | |
| 3,834,539 A | 9/1974 | Thompson | |
| 3,843,520 A | 10/1974 | Bottorf | |
| 3,862,040 A | 1/1975 | Preus et al. | |
| 3,951,817 A | 4/1976 | Snyder | |
| 4,024,063 A | 5/1977 | Mori | |
| 4,028,191 A * | 6/1977 | Scott | 202/158 |
| 4,127,488 A | 11/1978 | Bell et al. | |
| 4,162,976 A | 7/1979 | Monson | |
| 4,243,527 A | 1/1981 | Leonard | |
| 4,253,965 A | 3/1981 | Pielkenrood | |
| 4,264,446 A | 4/1981 | Fregeau | |
| RE30,793 E | 11/1981 | Dunkers | |
| 4,319,998 A | 3/1982 | Anderson | |
| 4,328,101 A | 5/1982 | Broden | |
| 4,363,731 A | 12/1982 | Filippi | |
| 4,400,274 A | 8/1983 | Protos | |
| 4,422,931 A | 12/1983 | Wolde-Michael | |
| 4,447,325 A | 5/1984 | Pauley | |
| 4,476,021 A | 10/1984 | Souza | |
| 4,517,091 A | 5/1985 | Yamanaka et al. | |
| 4,551,247 A | 11/1985 | Borchert et al. | |
| 4,678,589 A | 7/1987 | Ayres et al. | |
| 4,744,896 A | 5/1988 | James et al. | |
| 4,747,962 A | 5/1988 | Smisson | |
| 4,783,266 A | 11/1988 | Titch et al. | |
| 4,983,295 A | 1/1991 | Lamb et al. | |
| 4,985,148 A | 1/1991 | Monteith | |
| 5,116,516 A | 5/1992 | Smisson | |
| 5,133,619 A | 7/1992 | Murfae et al. | |
| 5,141,650 A | 8/1992 | Cavo et al. | |
| 5,174,892 A | 12/1992 | Davis | |
| 5,216,974 A | 6/1993 | Gordon, Sr. | |
| 5,232,587 A | 8/1993 | Hegemier et al. | |
| 5,298,176 A | 3/1994 | Schloss | |
| 5,322,629 A | 6/1994 | Stewart | |
| 5,332,499 A | 7/1994 | Spencer | |
| 5,372,714 A | 12/1994 | Logue, Jr. | |
| 5,403,474 A | 4/1995 | Emery | |
| 5,405,539 A | 4/1995 | Schneider | |
| 5,413,706 A | 5/1995 | Graves | |
| 5,433,845 A | 7/1995 | Greene et al. | |
| 5,450,818 A * | 9/1995 | Caillouet | 119/223 |
| 5,498,331 A | 3/1996 | Monteith | |
| 5,505,860 A | 4/1996 | Sager | |
| 5,520,825 A | 5/1996 | Rice | |
| 5,531,888 A | 7/1996 | Geiger et al. | |
| 5,543,038 A | 8/1996 | Johannessen | |
| 5,543,063 A | 8/1996 | Walker et al. | |
| 5,575,909 A | 11/1996 | Foster | |
| 5,643,445 A | 7/1997 | Billias et al. | |
| 5,725,760 A | 3/1998 | Monteith | |
| 5,744,048 A | 4/1998 | Stetler | |
| 5,746,911 A | 5/1998 | Pank | |
| 5,746,912 A | 5/1998 | Monteith | |
| 5,753,115 A | 5/1998 | Monteith | |
| 5,759,415 A | 6/1998 | Adams | |
| 5,788,848 A | 8/1998 | Blanche et al. | |
| 5,814,216 A | 9/1998 | Filion | |
| 5,814,230 A | 9/1998 | Willis et al. | |
| 5,843,306 A | 12/1998 | Singleton | |
| 5,849,181 A | 12/1998 | Monteith | |
| 5,858,252 A | 1/1999 | Darcy | |
| 5,902,477 A | 5/1999 | Vena | |
| 5,904,842 A | 5/1999 | Billias et al. | |
| 5,928,524 A | 7/1999 | Casola | |
| 5,944,991 A | 8/1999 | Shellenbarger et al. | |
| 5,980,740 A | 11/1999 | Harms et al. | |
| 6,003,251 A | 12/1999 | Walsh et al. | |
| 6,062,767 A | 5/2000 | Kizhnerman et al. | |
| 6,068,765 A | 5/2000 | Monteith | |
| 6,077,448 A | 6/2000 | Tran-Quoc-Nam et al. | |
| 6,086,756 A | 7/2000 | Roy | |
| 6,120,684 A | 9/2000 | Kistner et al. | |
| 6,132,626 A | 10/2000 | Hart | |
| 6,183,633 B1 | 2/2001 | Phillips | |
| 6,190,545 B1 | 2/2001 | Williamson | |
| 6,217,757 B1 | 4/2001 | Fleischmann | |
| 6,241,881 B1 | 6/2001 | Pezzaniti | |
| 6,264,835 B1 | 7/2001 | Pank | |
| 6,270,663 B1 | 8/2001 | Happel | |
| 6,315,897 B1 | 11/2001 | Maxwell | |
| 6,315,899 B1 | 11/2001 | Hernandez | |
| 6,337,016 B1 | 1/2002 | Alper | |
| 6,350,299 B1 * | 2/2002 | Dekker et al. | 95/268 |
| 6,350,374 B1 | 2/2002 | Stever et al. | |
| 6,371,690 B1 | 4/2002 | Monteith | |
| 6,428,692 B2 | 8/2002 | Happel | |
| 6,432,298 B1 | 8/2002 | Carvalko, Jr. | |
| 6,478,954 B1 | 11/2002 | Turner, Jr. et al. | |
| 6,511,595 B2 | 1/2003 | Crompton et al. | |
| 6,524,473 B2 | 2/2003 | Williamson | |
| 6,531,059 B1 | 3/2003 | Morris et al. | |
| 6,547,962 B2 | 4/2003 | Kistner et al. | |
| 6,581,783 B2 | 6/2003 | Blanche et al. | |
| 6,641,720 B1 | 11/2003 | Crompton et al. | |
| 6,676,832 B2 | 1/2004 | de Bruijn et al. | |
| 6,705,049 B2 | 3/2004 | Esmond et al. | |
| 6,730,222 B1 | 5/2004 | Andoh et al. | |
| 6,749,068 B1 | 6/2004 | Dias | |
| 6,783,683 B2 | 8/2004 | Collings | |
| 2002/0139736 A1 | 10/2002 | Stever et al. | |
| 2003/0019800 A1 | 1/2003 | Romanyszyn et al. | |
| 2003/0121850 A1 | 7/2003 | Use et al. | |
| 2003/0164341 A1 * | 9/2003 | Use et al. | 210/776 |
| 2003/0178359 A1 | 9/2003 | Posselt | |
| 2004/0055950 A1 | 3/2004 | Bryant | |

FOREIGN PATENT DOCUMENTS

| | | |
|---|---|---|
| DE | 3305344 | 9/1984 |
| EP | 79302155.1 | 4/1980 |
| EP | 0359592 A2 | 3/1990 |
| FR | 2536672 | 6/1984 |
| FR | 2694748 | 2/1994 |
| GB | 18285 | 11/1915 |
| GB | 604083 | 6/1948 |
| GB | 2126264 A | 3/1984 |
| GB | 2127319 | 4/1984 |
| GB | 2167689 A | 6/1986 |
| JP | 55-114313 | 3/1980 |
| JP | 9-262409 | 10/1997 |
| JP | P2000-5509 | 1/2000 |
| WO | WO89/07971 | 9/1989 |
| WO | WO99/42409 | 8/1999 |
| WO | WO99/45214 | 9/1999 |
| WO | WO 00/62888 A | 10/2000 |
| WO | WO00/062896 | 10/2000 |
| WO | WO02/04754 | 1/2002 |
| WO | WO02/085488 | 10/2002 |
| WO | WO03/031730 | 4/2003 |
| WO | WO2004/103520 | 12/2004 |

OTHER PUBLICATIONS

Aquarius Services & Technologies company website www.aquarius-h2o.com, technical description of DLC separator, 4 pp, original publication date unknown.

James Hardie FRC Pipes company technical brochure, Q-Guard Stormwater Treatment Device—Series X; copr 2002; references 2 patent documents.

Marsalek, J., Laboratory Testing of Stormceptor I, paper, May 1993, 35 pp, National Water Research Institute, Burlington, Ontario, Canada.

Marsalek, J., Long, R., Doede, D., Laboratory Testing of Stormceptor II, paper, Oct. 1994, 38 pp, National Water Research Institute, Burington, Ontario, Canada.

* cited by examiner

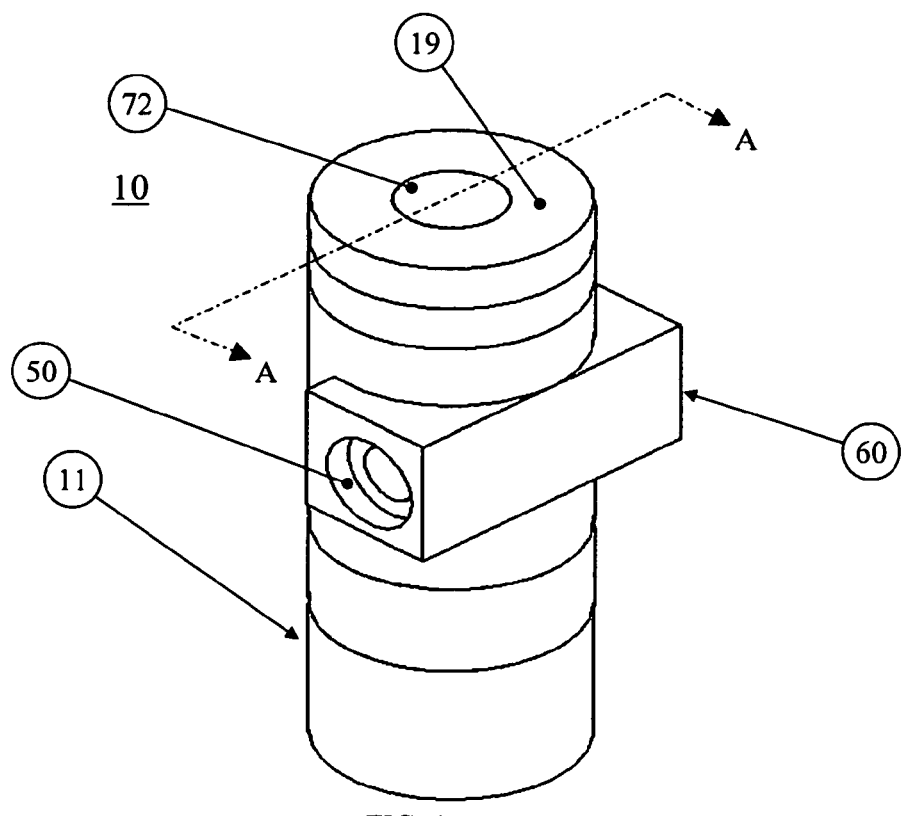
FIG. 1A
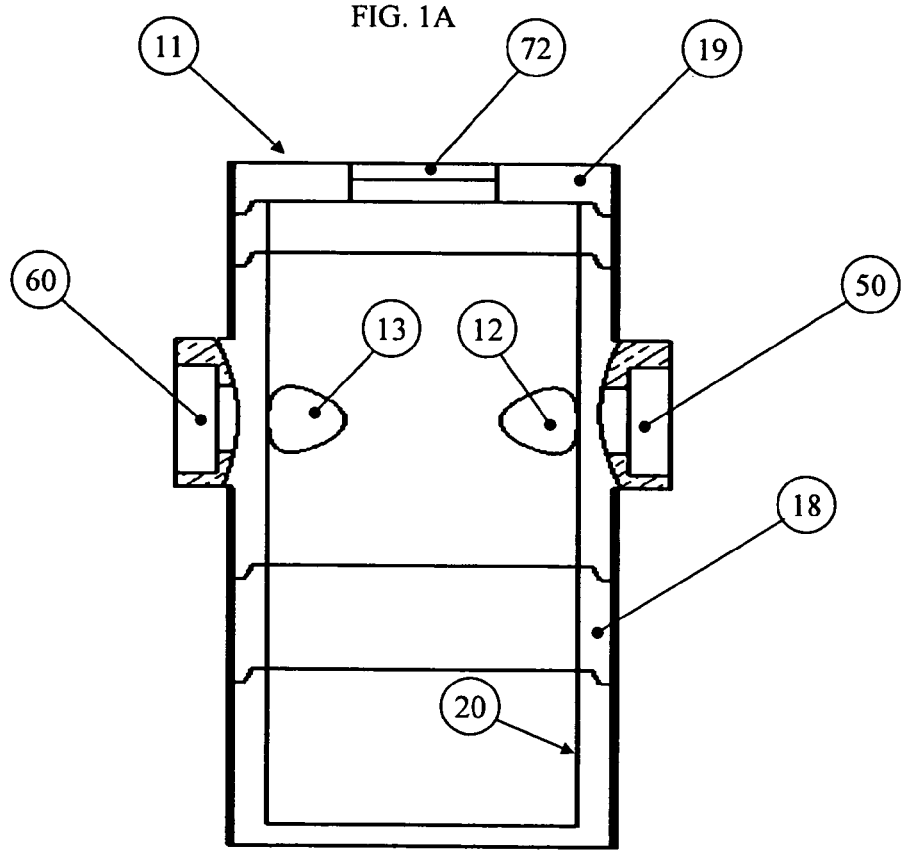
FIG. 1B (SECTION A-A)

APPARATUS FOR SEPARATING PARTICULATES FROM A FLUID STREAM

CROSS REFERENCE TO RELATED APPLICATION

This application is a continuation-in-part of U.S. patent application Ser. No. 10/664,376, filed Sep. 17, 2003, now U.S. Pat. No. 6,991,114 entitled "APPARATUS FOR SEPARATING FLOATING AND NON-FLOATING PARTICULATE FROM A FLUID STREAM" owned by a common assignee. The content of that application is incorporated herein by reference and priority is claimed therein.

BACKGROUND OF THE INVENTION

1. Field of the Invention

The present invention relates to systems for separating particulates from fluids such as drain water and stormwater. Such particulates include particulates that float under most fluid movement conditions, particulates that do not float under most fluid movement conditions, and particulates that may be caught up in the fluid stream when the fluid is flowing, but that may otherwise float or be suspended within the fluid when the fluid is substantially stagnant. More particularly, the present invention relates to a separation system that may be independent, or form part, of a larger fluid transfer system.

2. Description of the Prior Art

Fluid transfer systems have been and will remain an important aspect of municipal services and commercial facilities management. The protection of ground water and natural bodies of water requires systems for diverting and/or treating water that contacts roadways, parking lots, and other man made structures. If such diversion or treatment systems are not provided, particulates and contaminants located on or forming part of such structures may be carried by drain water or stormwater to the natural water bodies and contaminate them. Local, state and federal laws and rules require municipalities, businesses and, in some instances, private entities, to establish means to reduce particulate and contaminant levels permissibly transferred to natural bodies of water from property under their control. Particular requirements may vary from jurisdiction to jurisdiction, but all are likely to become more, rather than less, stringent.

Previously, municipal water transfer and treatment facilities provided the only mechanism for diverting contaminated water away from natural bodies of water, either for holding or treatment for subsequent transfer to natural settings. In general, that process involved, and continues to involve, the establishment of a system of drains, such as in a parking lot or at a street curb, by which water enters a system of pipe conduits. Eventually, the water received from the drains reaches either a final outlet destination or is directed to a treatment system for contaminant removal. For purposes of the description of the present invention, "contaminated water" is to be understood to mean any water including floating particulates, such as Styrofoam™ containers and oil, for example; non-floating particulates, such as sand and silt, for example; and entrained contaminants, such as dissolved nutrients or metals, for example.

Land development produces increased levels of drain water and stormwater runoff, resulting in increased strain on existing water transfer and treatment infrastructure and an increased likelihood of natural water contamination. In an effort to reduce the impact of development on natural resources and municipal services, initial upstream fluid treatment has become a requirement in many land development, restoration and repair projects. That is, requirements in various forms have been established to ensure that before contaminated water enters the municipal water transfer and/or treatment system, it must be treated in a manner that reduces the level of contaminants entering the municipal system. Therefore, most new land development plans and upgrades to existing paved surfaces involve the insertion of a preliminary separation system, generally for connection to the municipal water-handling infrastructure.

Any preliminary separation system must be designed with the capability to receive fluid flowing in at a wide range of rates. For example, a mild rainfall resulting in rain accumulation of less than 0.25 inches over a span of 24 hours produces a relatively low flow rate through the system. On the other hand, for example, a torrential rainfall resulting in rain accumulation of more than two inches over a span of three hours produces relatively high flow rates through the system. It is desirable, then, to have a separation system capable of handling variable fluid flow rates with reduced likelihood of backup and flooding of the surface above. It is also desirable to control the flow through the system such that trapped particulates are not scoured or washed out of the device and re-entrained during high flows for passage downstream.

In addition to having a reasonable fluid flow throughput capacity, the separation system must be capable of performing the separation function for which it is intended. Specifically, it may be required to remove from the fluid flow path a certain number, type, or size of particulates. For example, some California municipalities require the removal of any particulates with dimensions greater than five millimeters. It would be preferable to have such a separation system that can remove from the fluid flow path the particulates for which it is designed at the widest range of flow rates but without causing backup or scouring/washout. For that reason, some such systems are designed with a bypass mechanism to permit direct flow through of fluid without preliminary treatment when relatively high flow rates are reached. Unfortunately, ineffectively designed separation systems fail to provide the best particulate removal and further fail to do so under flow rates that may not be particularly high.

There is an increasing need and requirement for separation systems associated with drain water and stormwater introduction to municipal water handling systems. However, it is important that they not be prohibitively expensive in order to ensure that meeting those needs and requirements is feasible. It is also of importance that such separation systems are relatively easy to access for maintenance. It is also preferable that separation systems provide a reasonable arrangement for storing accumulated particulates to minimize the possibility of clogged inlets and outlets and to extend the required maintenance cycle. Inline treatment systems of relatively modest size are particularly desirable for incorporating into existing fluid transfer systems, however, they may be prone to shorter maintenance cycles as a result of competing goals of reduced size, exit blockage minimization, and flow through capacity requirements.

Therefore, what is needed is a separation system that may or may not be part of a larger fluid handling system that is effective in accommodating varied fluid flow rates. What is also needed is such a separation system that conforms or substantially conforms with established particulate removal requirements. Further, what is needed is such a separation system that is configured to minimize clogging possibilities and to maximize particulate removal capability in a cost effective arrangement. Yet further, what is needed is such a separation system that includes means to minimize exit blockage under anticipated fluid flow conditions without compromising separation capability.

SUMMARY OF THE INVENTION

It is an object of the present invention to remove particulates including, but not limited to, trash, oil, dirt, and grease from fluid systems. It is also an object of the present invention to provide a separation system that is effective in accommodating varied fluid flow rates. It is another object of the present invention to provide such a separation system that conforms or substantially conforms with established particulate removal requirements. Further, it is an object of the invention to provide such a separation system that is configured to minimize clogging possibilities and to maximize particulate removal capability in a cost effective arrangement. Yet further, it is an object of the present invention to provide such a separation system that includes means to minimize exit blockage under anticipated fluid flow conditions without compromising separation capability.

These and other objectives are achieved with the present invention. The invention is a fluid separation system including an apparatus for screening particulates from the fluid stream in a manner that reduces flow blockage without compromising fluid flow through capacity. For the purpose of the description of the present invention, the types of particulates principally to be separated from the fluid stream passing through the fluid separation system are those particulates that may be caught up in the fluid stream when the fluid is flowing, but that may otherwise float, sink, or be suspended within the fluid when the fluid is substantially stagnant. Such particulates will be referred to herein as neutrally-buoyant particulates. Examples of such particulates include, but are not limited to, newspapers, plastic and paper bags, envelopes, leaves, branches, and anything else that may not otherwise always float or always sink under all fluid movement conditions.

The screening apparatus is preferably combined with a diverter element of a separation system, such as a baffle, wherein the diverter is arranged to shape fluid flow patterns and to prevent floating particulates from exiting the separation system. More particularly, the screening apparatus aids the diverter by capturing any entrained or neutrally-buoyant floatables from circumventing the diverter without substantially reducing fluid flow rate past the diverter. The screening apparatus is substantially porous and may extend from and beyond the diverter. The objects of the present invention may be further advanced by the addition of a secondary screening apparatus of the present invention. The secondary screening apparatus is designed to capture floating particulates, particularly when the fluid surface elevation in the separation system is relatively high. As the fluid surface elevation is lowered under reduced fluid flow conditions, the secondary screening apparatus retains a portion of the floating particulates above the fluid surface elevation for subsequent removal. The secondary screening apparatus thereby reduces the amount of floating particulates in the separation system that may block the system exit. Further, the secondary screening apparatus may allow any particulates residing thereon to dry out when the fluid surface elevation drops. That drying slows particulate decomposition and may make particulate removal easier. Moreover, the retention of the particulates out of the fluid on the secondary screening apparatus prevents the leaching out of any contaminants retained on those particulates into the fluid.

In one aspect of the invention, an apparatus is provided for separating particulates, including floating, non-floating, and neutrally-buoyant particulates, from a fluid. The apparatus includes a tank having a bottom and interior sidewalls to define a storage chamber, an inlet at a first location on the interior sidewalls for receiving the fluid, and an outlet at a second location on the interior sidewalls for transferring the fluid out of the tank, a baffle positioned in the tank and having a lower portion including a bottom spaced above the bottom of the tank, and a screen positioned in the tank, wherein the screen extends from the bottom of the baffle into the lower portion of the storage chamber. The screen may be fabricated of a porous material such as perforated metal, for example, but is not limited thereto. One portion of the screen may be porous while another portion is non-porous. The leading edge of the screen, defined as that portion of the screen first contacted by the fluid stream within the storage chamber prior to exiting the storage chamber, may be non-porous. The apparatus may also include a second screen spaced above the substantially vertically oriented screen, wherein the second screen is substantially horizontally oriented and positioned above the expected resting fluid surface in the tank. In an alternative embodiment, the second screen may be of conical shape. The apparatus may also include a collection weir, wherein the second screen may be separate from, or removably affixed to, the collection weir. The combination of the collection weir and the second screen including a port through which fluid from the storage chamber passes before passing onto the second screen. The bottom surface of the second screen is preferably disposed above a crown of the tank inlet.

In another aspect of the invention, an apparatus to improve the separation of particulates, including neutrally-buoyant particulates, from a fluid passing into a separation tank including an inlet, an outlet, and an arrangement for diverting at least a portion of the fluid from the inlet into the tank prior to the fluid exiting via the outlet is provided. The apparatus is a screen positionable within the tank and configured to filter out relatively large particulates from the diverted fluid prior to the fluid exiting the tank via the outlet, the screen is further configured to minimize the inhibition of fluid flow from the tank to the outlet. The screen is fabricated of a porous material such as perforated metal, and one portion may be porous while another is non-porous, the non-porous portion preferably being the leading edge of the screen. The apparatus may include a second screen spaced above the substantially vertically oriented screen, wherein the second screen is substantially horizontally oriented and positioned above the expected resting fluid surface in the tank. Further, the second screen may form part of a collection weir system, the combination of the collection weir and the second screen including a port through which fluid from the tank passes before passing onto the second screen. A system including just the second screen alternatively provides means for retaining floating particulates out of the tank when the fluid level within the tank recedes.

In an alternative embodiment of the invention, a separation system for separating floating and non-floating particulates from a fluid includes a tank having a bottom and interior sidewalls to define a storage chamber, an inlet at a first location on the interior sidewalls for receiving the fluid, and an outlet at a second location on the interior sidewalls for transferring the fluid out of the tank, an upper baffle spaced from the interior sidewalls of the tank and having an upper baffle bottom and an upper baffle port to allow fluid entering the tank to pass from behind the upper baffle into the storage chamber, a bypass including an inlet flow control means for controlling fluid flow from the inlet through the upper baffle port, the bypass spaced between the upper baffle and the tank interior sidewalls, a lower baffle having a lower baffle bottom spaced above the bottom of the tank, wherein the lower baffle is positioned within the tank below the level of the upper baffle, and a weir positioned between the inlet flow control means and the outlet, the weir configured to divert fluid from the inlet to the upper baffle port under relatively low fluid flows and to divert one portion of the fluid from the inlet to the upper baffle port and to allow the remaining portion of the fluid to flow from the inlet to the outlet under relatively high fluid flows.

In another alternative embodiment of the present invention, a separation system for separating floating and non-floating particulates from a fluid includes a tank having a bottom and interior sidewalls to define a storage chamber, an inlet at a first location on the interior sidewalls for receiving the fluid, and an outlet at a second location on the interior sidewalls for transferring the fluid out of the tank, a baffle having a bottom, a first side baffle wall, a second side baffle wall and a port, wherein the baffle is positioned within the tank, the bottom of the baffle spaced above the bottom of the tank, a bypass including an inlet flow control means on the second side baffle wall between the inlet and the port of the baffle, a screen extending from the bypass into the storage chamber, and a weir positioned to divert fluid from the inlet to the baffle port under relatively low fluid flows and, under relatively high fluid flows, to divert one portion of the fluid from the inlet to the baffle port while allowing the remaining portion of the fluid to flow from the inlet to the outlet without entering the storage chamber through the baffle port.

The details of one or more examples related to the invention are set forth in the accompanying drawings and the description below. Other features, objects, and advantages of the invention will be apparent from the description and drawings, and from the appended claims.

BRIEF DESCRIPTION OF THE DRAWINGS

FIG. 1A is a perspective view of a particulate separation tank including the screen apparatus of the present invention. FIG. 1B is a cross-sectional elevation view of the tank at Section A-A of FIG. 1A, showing the inlet, the outlet and the associated pipe sockets.

DETAILED DESCRIPTION OF THE PREFERRED EMBODIMENTS

A separation system 10 including a screen apparatus of the present invention is illustrated in the accompanying drawings. As illustrated in FIGS. 1A and 1B, the system 10 includes a tank 11 having an inlet pipe socket 50 and an outlet pipe socket 60. The tank 11 is preferably made of concrete but may alternatively be fabricated in whole or in parts of metal, plastic, such as fiberglass, or other suitable materials. It may be fabricated of an existing manhole or manhole design and modified in the manner to be described herein. The inlet pipe socket 50 shown in FIG. 1A is used to connect the tank 11 to an upstream fluid source or transfer system, such as through an upstream conduit (not shown). Similarly, the outlet pipe socket 60 shown in FIG. 1A is used to connect the tank to a downstream fluid transfer system, such as through a downstream conduit (not shown). For example, the upstream fluid transfer system may include a drainage system from a roadway or a parking lot and the downstream fluid transfer system may include a municipal water treatment plant or natural or artificial surface waters. It is to be understood that the tank 11 may not be specifically connected to an upstream conduit transfer arrangement, nor to a downstream conduit transfer arrangement. Instead, fluid may enter the tank 11 through some form of inlet, and may exit the tank 11 through some form of outlet, including spilling directly out of the tank onto or into an unspecified container, body of fluid, or any sort of receptacle.

Figure 2:
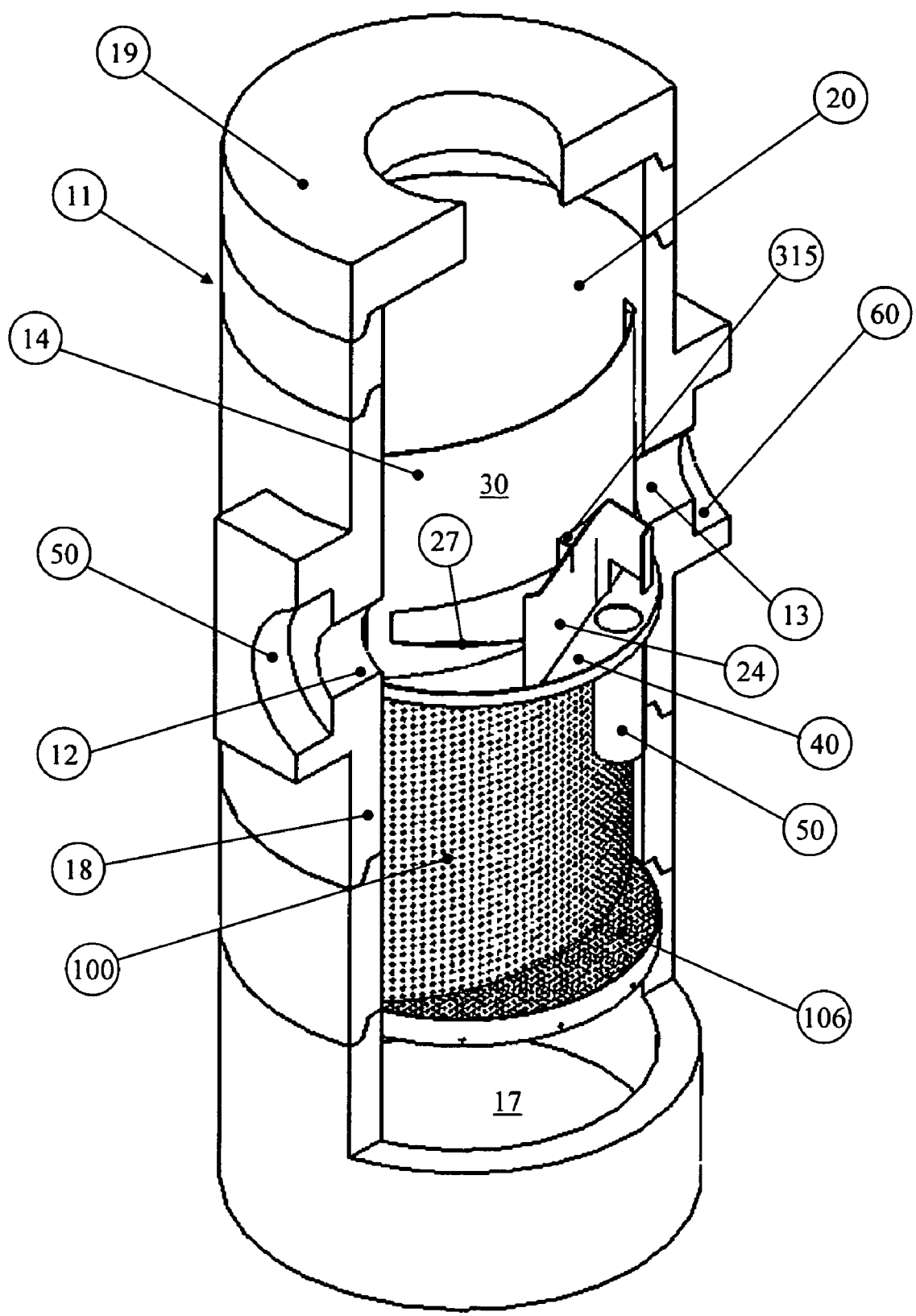
FIG. 2 is a partial cutaway perspective view of the particulate separation tank including the screen apparatus of the present invention from behind the baffle and the screen.

The tank 11 includes an inlet 12 associated with the inlet pipe socket 50, an outlet 13 associated with the outlet pipe socket 60, a diverter for directing fluid flow and/or for trapping particulates, such as baffle 14, and a screen 100, as shown in FIG. 2. The tank 11 establishes a storage chamber 16 defined by a tank bottom 17, sidewalls 18 in a cylindrical form that may alternatively be in a polygonal form, and a lid 19. The lid 19 shown in FIGS. 1A and 1B substantially completely covers the tank 11 and may include an access port with access port cover 72 for accessing the interior of the storage chamber 16 for maintenance purposes without removing the entire lid 19. Alternatively, the height of the sidewalls 18 and the baffle 14 may be set to ensure that they are above the highest possible fluid surface elevation, thereby eliminating the need for a lid while allowing the interior of the tank 11 to be open for inspection.

Figure 3:
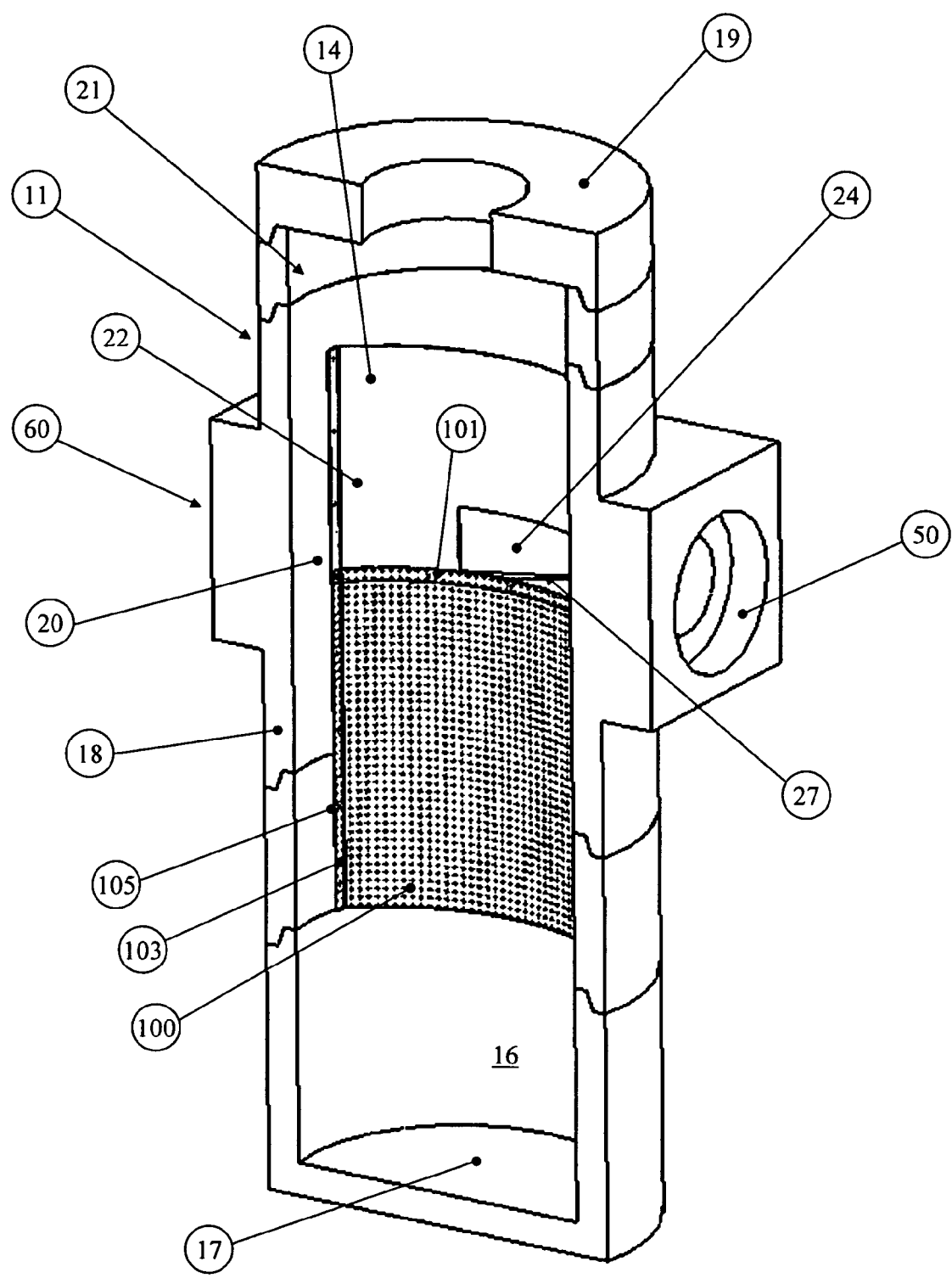
FIG. 3 is a cross-sectional perspective view of a particulate separation tank showing the retention section or storage chamber, the tank inlet pipe socket, the baffle, and the screen of the present invention.

The baffle 14 is located within the tank 11 as a sectional wall removably attachable to an interior side 20 of the sidewalls 18. The baffle 14 may optionally be positioned within the tank 11 by means other than attachment to the interior side 20 of the tank 11. For example, it may be slottingly fitted into the tank 11, attached to the bottom 17 of the tank 11, or suspended within the tank 11. The baffle 14 extends downward from a top area 21 of the tank 11 to a point above the tank bottom 17 and effectively divides the tank 11 into a bypass region behind the baffle 14 and a treatment region that is the storage chamber 16 in front of and below the baffle 14. An inner sidewall 22 of the baffle 14 is configured to prevent floating particulates from exiting the storage chamber 16 of the tank 11. As illustrated in FIG. 2, an outer sidewall 30 of the baffle 14 and the screen 100 are spaced from the interior side 20 of the tank 11. The tank 11 may include a flow control system 40 designed to aid in the shaping of fluid flowing into the storage chamber 16 and an outlet tube 50 that reduces the likelihood of any floating material, such as oil, exiting the outlet 13 through the screen 100. The outlet tube 50 preferably extends below the expected fluid surface elevation such that any floatables passing through the screen 100 would be trapped under the flow control system 40. A tube arrangement of the type shown in FIG. 2 may not be desired or required for a separation system having a solid structure, such as a baffle, extending below flow control system 40. Instead, an outlet port may be used, as any floating particulates would be trapped by the solid structure. As shown in FIGS. 2 and 3, the baffle 14 includes a baffle port 27 spaced from the tank inlet 12. The baffle port 27 is preferably configured to direct flow entering the tank 11 at the tank inlet 12 in a manner that generates a fluid flow tangential to the inner sidewall 22 of the baffle and the interior side 20 of the sidewalls 18 of the tank 11. The baffle 14 may terminate at or below the level of the flow control system 40.

Figure 4:
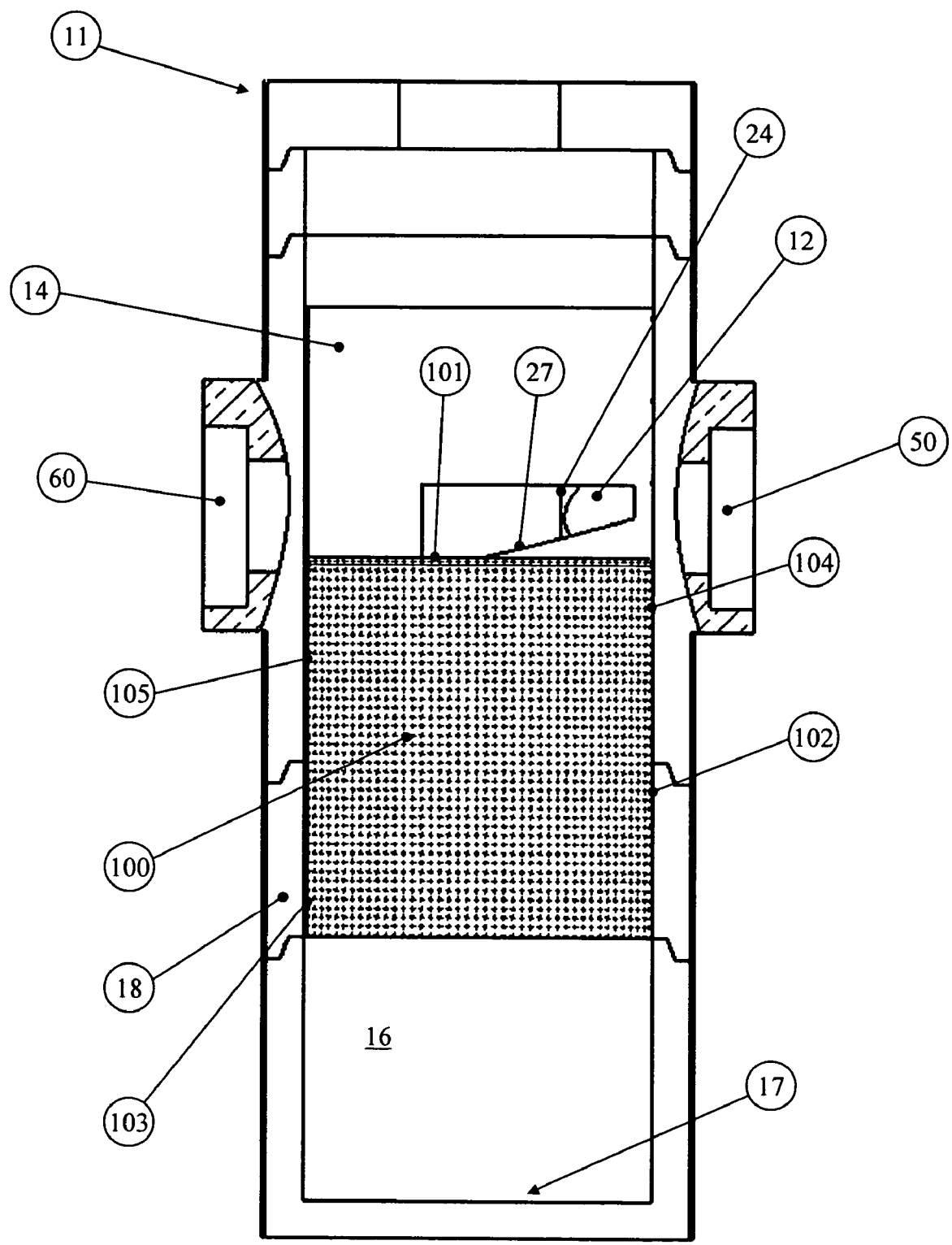
FIG. 4 is a cross-sectional elevation view of a section of a particulate separation tank, showing a first embodiment of the screen, baffle, baffle port and pipe sockets.

The shape and dimensions of the baffle port 27 may be varied or selected as a function of the particular flow conditions to be expected. However, as shown in FIG. 4, one embodiment of the baffle port 27 is shaped to have a smaller opening nearer the inlet 12 and increase in size and extending downwardly toward the tank bottom 17 moving away from the inlet 12. As a result, under low fluid flow conditions, the fluid is restricted from immediately entering the storage chamber 16 through the baffle port 27 as it passes between the outer sidewall of the baffle 14 and weir 24 until reaching the inner sidewall 22 of the baffle 14. That shaping of the baffle port 27 enables the fluid to enter the storage chamber 16 tangentially. The noted shape of the baffle port 27 also allows relatively high fluid flows to enter the storage chamber 16 without unnecessary restriction. A baffle port 27 of constant dimensions would be less effective in regulating fluid flow under all flow conditions. Under relatively low flow conditions, the weir 24 diverts all fluid into the storage chamber 16. Under relatively high flow conditions, the baffle port 27 becomes submerged and floating particulates within the storage chamber 16 are retained therein by the inner sidewall 22 of the baffle 14 and that portion of the interior side 20 of the tank not behind the baffle 14. Eventually, the flow rate is such that the fluid surface elevation exceeds the height of the weir 24 and bypass occurs.

In operation, the tank 11 enables the separation of particulates from a fluid. The fluid enters the tank 11 via the tank inlet 12 and initially passes behind the baffle 14. The fluid then passes through the baffle port 27 to the interior sidewall 22 of the baffle where a swirling motion is established along the inner sidewall 22 of the baffle 14 and interior side 20 of the tank 11. The swirling motion of the fluid directs floating particulates to the center of the storage chamber 16 at or near the surface water elevation, dependent upon fluid flow rate, as indicated above. Non-floating particulates are directed downwardly to the tank bottom 17 and swept to the center of the tank 11. The treated fluid then passes through the screen 100, and out of the tank 11 via the outlet 13, either directly or through outlet tube 50. The screen 100 aids in supplemental filtering of neutrally-buoyant particulates from the fluid prior to the fluid exiting. That is, the screen 100 is preferably positioned within the tank 11 between where floating particulates are expected to accumulate above and non-floating particulates are expected to accumulate below. The weir 24 diverts fluid through the baffle port 27 and forms part of a bypass arrangement wherein relatively high fluid flows result in a portion of the fluid passing from the inlet 12 to the outlet 13 without being treated in the storage chamber 16.

As shown in FIGS. 2-4, the screen 100 includes an upper screen portion 101 removably attachable to the interior side 20 of the tank 11. When the tank 11 is deployed for use in treating fluid, the baffle 14 and the screen 100 are preferably oriented substantially vertically. The screen 100 further includes a first or leading edge side screen flange 102 at screen leading edge 104, and a second or trailing edge side screen flange 103 at screen trailing edge 105, for removable attachment of the screen 100 to the interior side 20 of the tank 11. The screen 100 preferably extends downwardly from the baffle 14 into the lower portion of the storage chamber 16, extending closer to the tank bottom 17 than does the baffle 14. As shown in FIG. 2, a bottom portion of the screen 100 includes screen extension 106 extending from the screen 100 to the interior side 20 of the tank 11 in the region of the tank 11 behind the screen 100. The screen extension 106 prevents particulates such as neutrally-buoyant particulates from passing up behind the screen 100 to the tank outlet 13. The screen extension 106 may be made of the same material as is the main body of the screen 100. The screen extension 106 is preferably configured to allow any relatively small particulates that may be located behind the baffle 14 to pass therethrough and fall to the tank bottom 17 of the storage chamber 16. The screen 100 is preferably configured and arranged to aid in the separation of neutrally buoyant particulates from the fluid in the storage chamber 16.

The baffle 14 shown in FIGS. 2-4 is formed with a single curvature aspect to direct the fluid flow within the tank 11, and an angled weir 24 to direct the fluid flow through the baffle port 27. The screen 100 is preferably similarly curved to minimize fluid flow pattern disruption. Alternatively, the baffle 14 may be formed of a complex curvature, and the weir 24 may also be curved. If the baffle 14 is shaped with such complex curvature, the screen 100 may also be similarly curved, although that is not specifically required, as the fluid flow pattern is likely already established by the time the screen leading edge 104 is reached and the likelihood of producing turbulence with a screen curvature different from the baffle curvature at the screen trailing edge 105 is minimized; however, a screen 100 of different curvature would likely complicate the manufacturing of the present invention.

Figure 5:
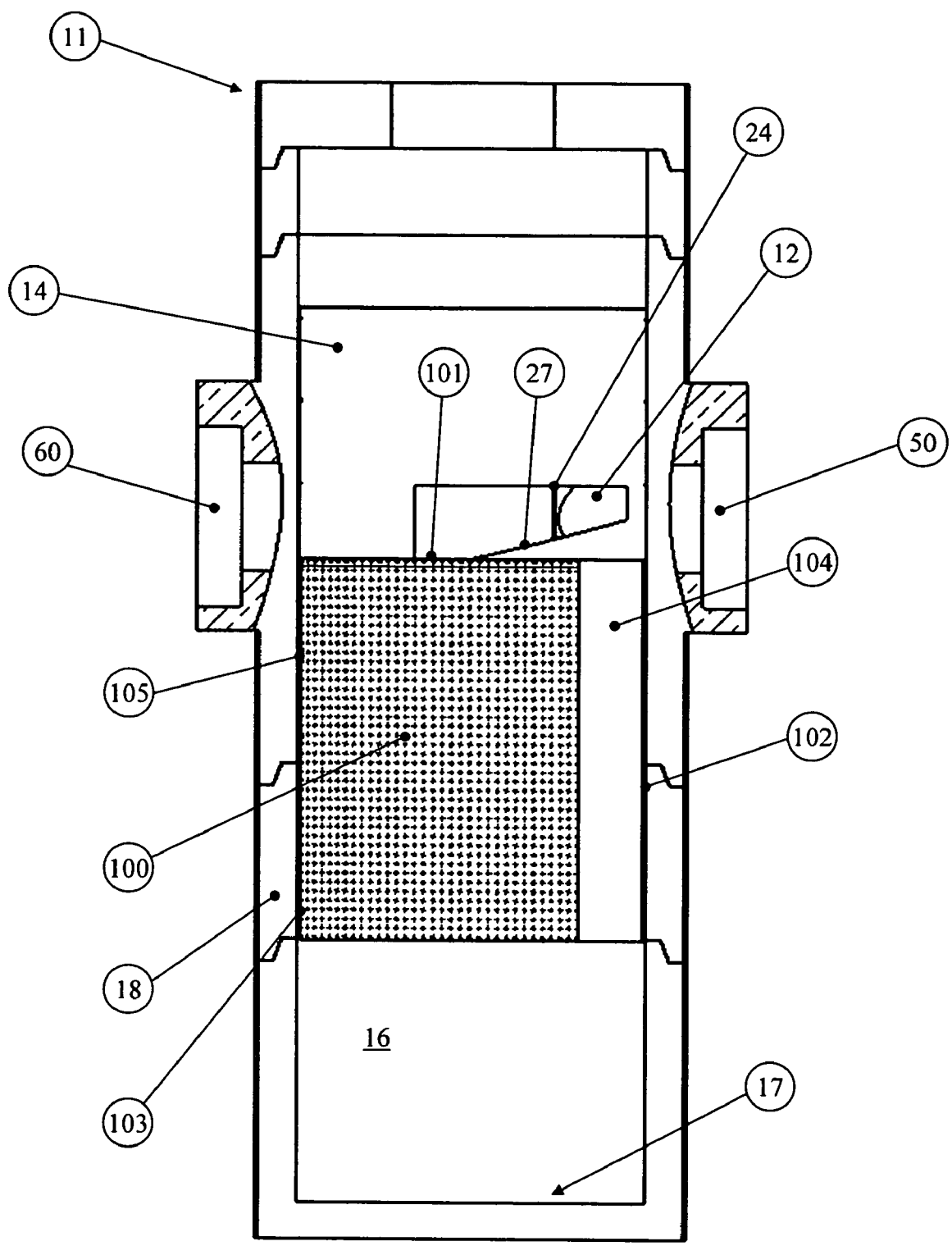
FIG. 5 is a cross-sectional elevation view of a section of a particulates separation tank, showing a second embodiment of the screen, baffle, baffle port and pipe sockets.

The screen 100 shown in FIGS. 2-4 includes a plurality of openings that make it substantially completely porous. The flanges 102 and 103 may be solid or porous, dependent upon the method for affixing the screen 100 to the interior side 20 of the tank 11. The screen 100 may be fabricated of a metallic material, such as a perforated metal, or a non-metallic material such as a plastic screen. In an alternative embodiment of the screen 100 shown in FIG. 5, the screen leading edge 104 of the screen 100 is nonporous. That is, the material selected to fabricate the screen 100 may be made with a porous section and a non-porous section. Alternatively, the screen 100 may be fabricated of two pieces joined together, one solid and the other porous. The solid leading edge 104 of the screen 100 of FIG. 5 is designed to improve fluid velocity distribution at the tank-to-screen interface. The improved fluid velocity distribution reduces particulate accumulation on the screen 100 at that interface. Particulates accumulating at the leading edge 104 may cause a build up that would prevent follow-on particulates from reaching the screen 100 downstream, thereby accelerating the need for screen maintenance. The extent to which the leading edge 104 remains nonporous should be determined by the expected flow conditions, maintenance scheduling, and the operational environment.

Figure 6:
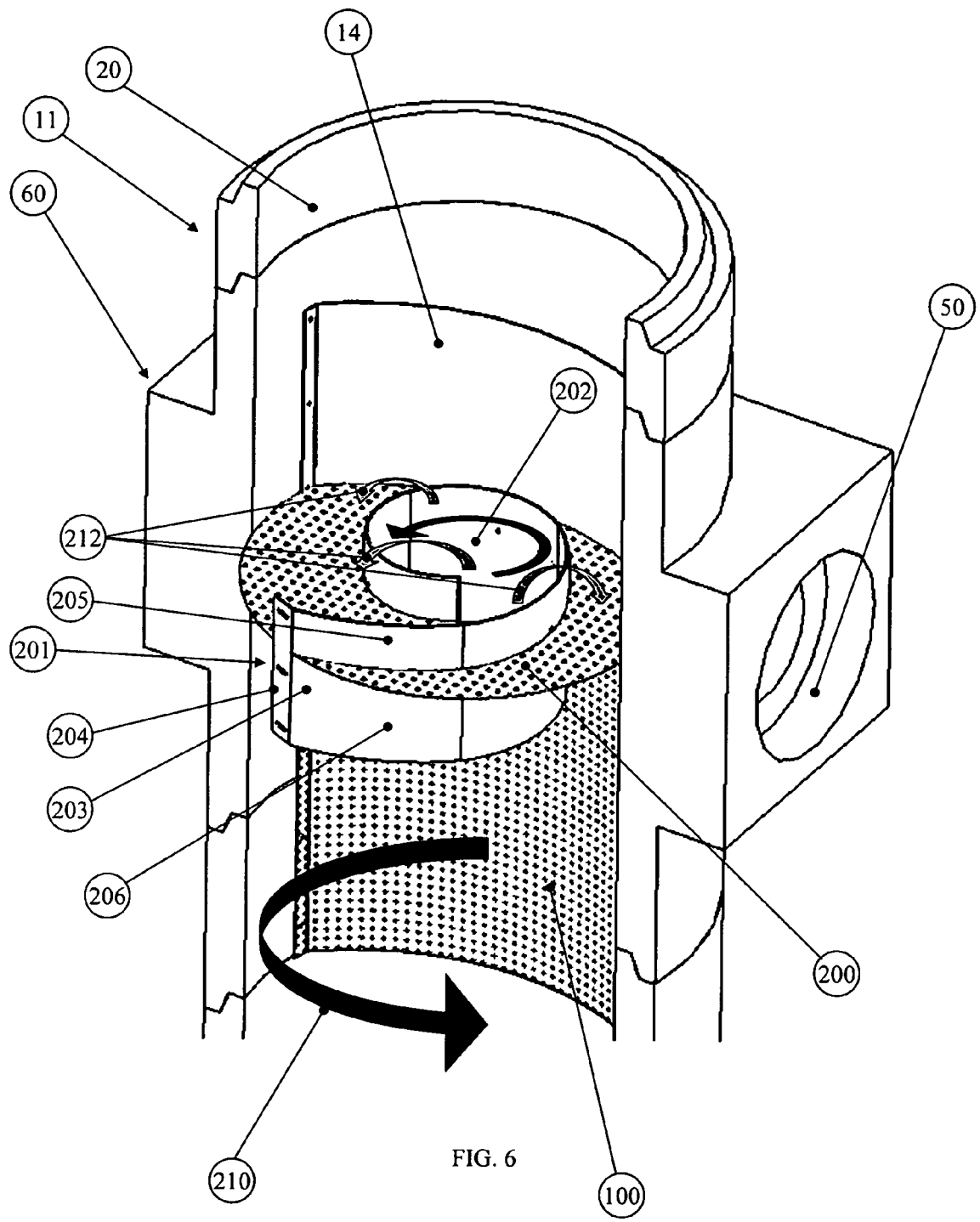
FIG. 6 is a cutaway perspective view from a first angle of an optional second screen apparatus of the present invention.
Figure 7:
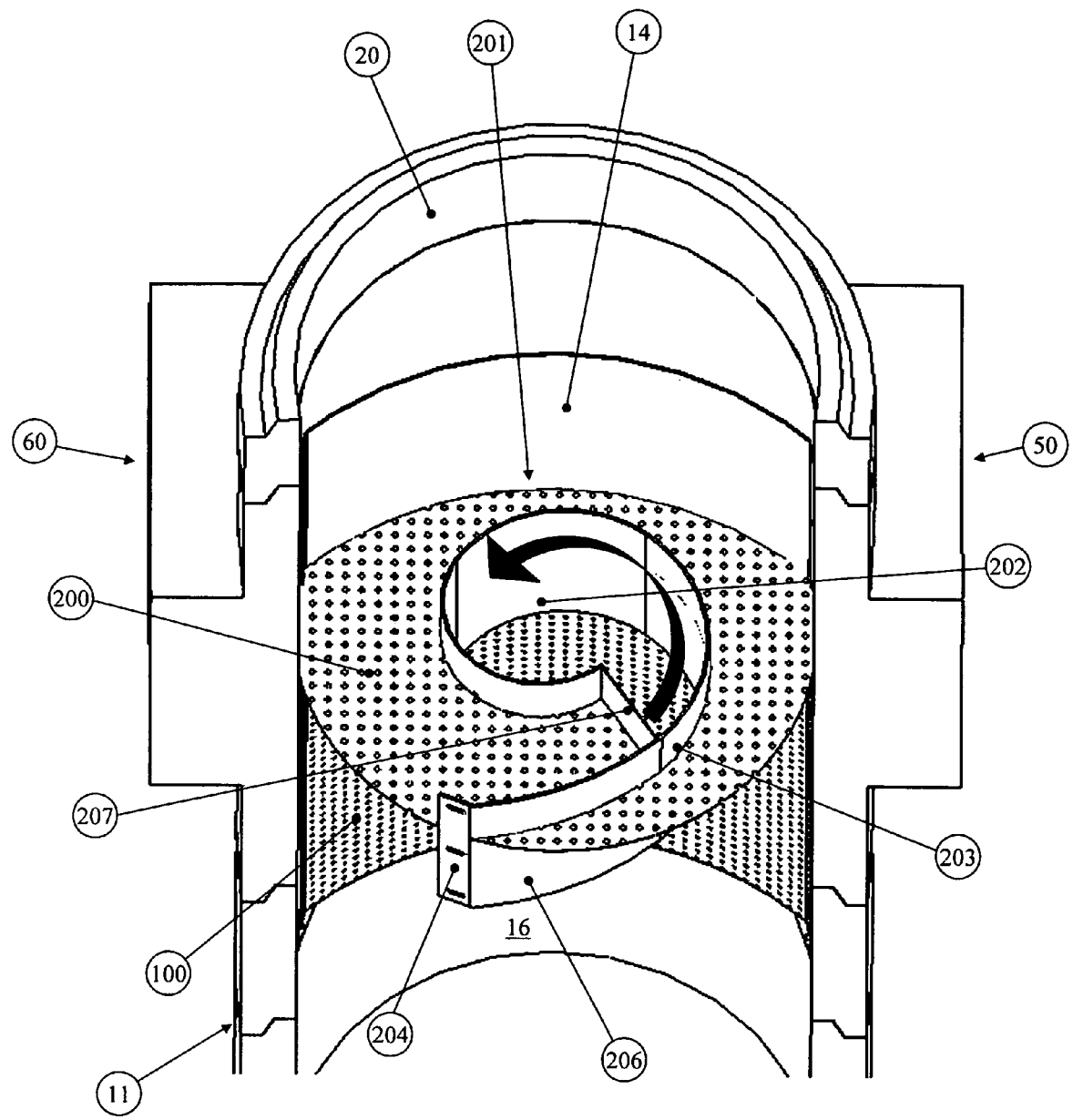
FIG. 7 is a cutaway perspective view from a second angle of the optional second screen apparatus of the present invention.

As illustrated in FIGS. 6 and 7, a supplemental second screen 200 may be deployed in the tank 11 as a means to filter floating particulates. When the tank 11 is deployed for use in fluid filtering, the second screen 200 is preferably oriented substantially horizontally with respect to the centerline of the tank 11. However, it is to be understood that the second screen 200 may be oriented at an angle that aligns it other than horizontally with respect to the centerline of the tank 11. The second screen 200 includes a plurality of openings that make it substantially porous. A collection weir system 201 includes a screen port 202 formed as part of an arcuate frame 203 that is removably attachable to the interior side 20 of the tank 11 at frame flange 204. The second screen 200 is preferably retained in place by the frame 203 at a position above the crown elevation of inlet 12 such that the baffle port of the baffle 14 will become fully submerged when the fluid surface elevation reaches the second screen 200. The frame 203 may be positioned above the second screen 200 as an frame upper section 205. Alternatively, the frame 203 may be a split frame having a frame upper section 205 above the position of the second screen 200, and a frame lower section 206 below the screen 200. For either version, the frame upper section 205 further includes a weir plate 207. The height of the weir plate 207 in combination with the frame upper section 205 in combination define the fluid surface level at which fluid in the screen port 202, and any floating particulates contained therein, spills out above the upper portion of the second screen 200. The second screen 200 may also be used without the collection weir system 201 and without the screen 100. In that embodiment, the second screen 200 includes the screen port 202 and is positioned above the resting fluid surface to retain thereon floating particulates entering through the screen port 202.

With continuing reference to FIGS. 6 and 7, in operation, the second screen 200 in combination with the arcuate frame 203 provide a means for keeping floating particulates in the center of the tank 11, particularly at relatively low fluid flow rates, and in capturing floating particulates when the fluid surface elevation in the tank is very high. Specifically, storage chamber fluid, represented by arrow 210, swirling in the storage chamber 16 has a fluid surface elevation that rises with fluid entry into the tank 11. Between storm events, the standing elevation of the fluid is at the bottom level of the outlet 13. Under relatively low flow conditions, that level is substantially maintained, and the frame lower section 206 acts to capture floating particulates as a baffle, but does so in a manner that keeps the floating particulates away from baffle 14 and screen 100. That function by the frame lower portion 206 improves the fluid flow either through the screen 100, or directly under the baffle 14, by reducing floating particulate blockage.

As the fluid flow rate increases into the tank 11, the fluid elevation surface rises. The frame lower portion 206 continues to center any floating particulates in the tank 11. Further, the underside of second screen 200 blocks floating particulates from entering the upper region of the storage chamber 16 as the fluid elevation continues to rise. When the fluid elevation exceeds the screen 200, submerging the baffle port, the fluid and any floating particulates not otherwise trapped on the underside of the screen 200 enter the screen port 202, represented by arrow 211. When the fluid surface elevation exceeds the height of the frame upper portion 205 and weir plate 207, the fluid containing floating particulates, represented by arrows 212, spills over into an area above the second screen 200. As the incoming fluid flow rate subsides and the fluid surface elevation drops, floating particulates in the fluid 212 are captured on the upper surface of the second screen 200. These floating particulates are thereby prevented from re-entering the lower part of the storage chamber 16 where the outlet is located and cannot block the fluid from exiting the tank 11. Those floating particulates not captured by second screen 200 recede back into port 202 and are prevented from re-entering the storage chamber 16 by frame lower portion 206.

The screen 100 of the present invention improves the separation of entrained floating or neutrally-buoyant particulates from a treated fluid by trapping them prior to exiting the tank 11. The second screen 200 and the collection weir system 201 provide supplemental means for capturing floating particulates and/or isolating floating particulates from the area of the storage chamber 16 where the treated fluid passes to the tank outlet 13. The screen apparatus and the supplemental screen apparatus improve particulate removal for a system for separation floating and non-floating particulates from a fluid stream. Either or both devices may also extend maintenance periods by reducing blockage situations.

Figure 8A:
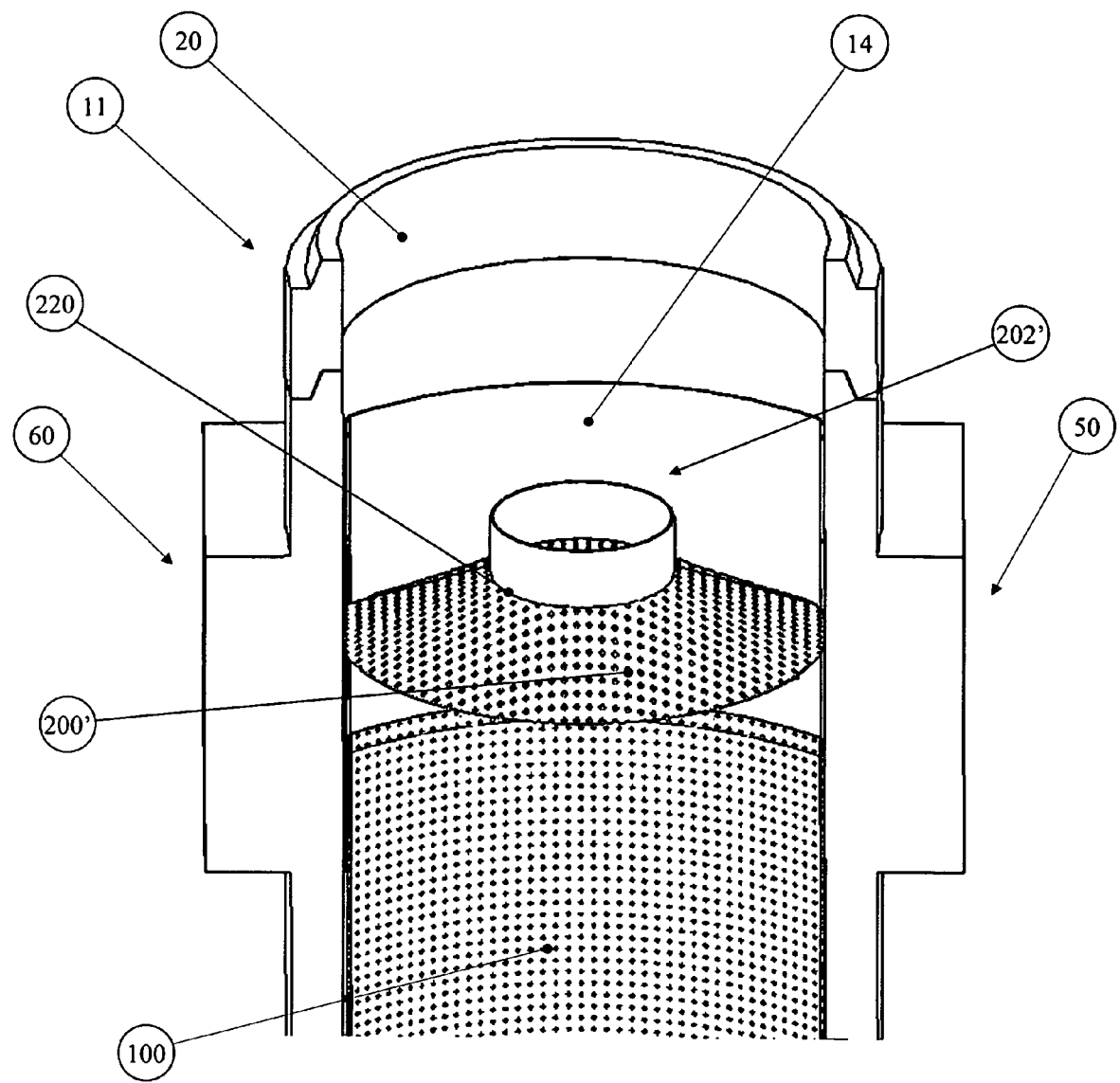
FIG. 8A is a cutaway perspective view of an alternative embodiment of the second screen apparatus.
Figure 8B:
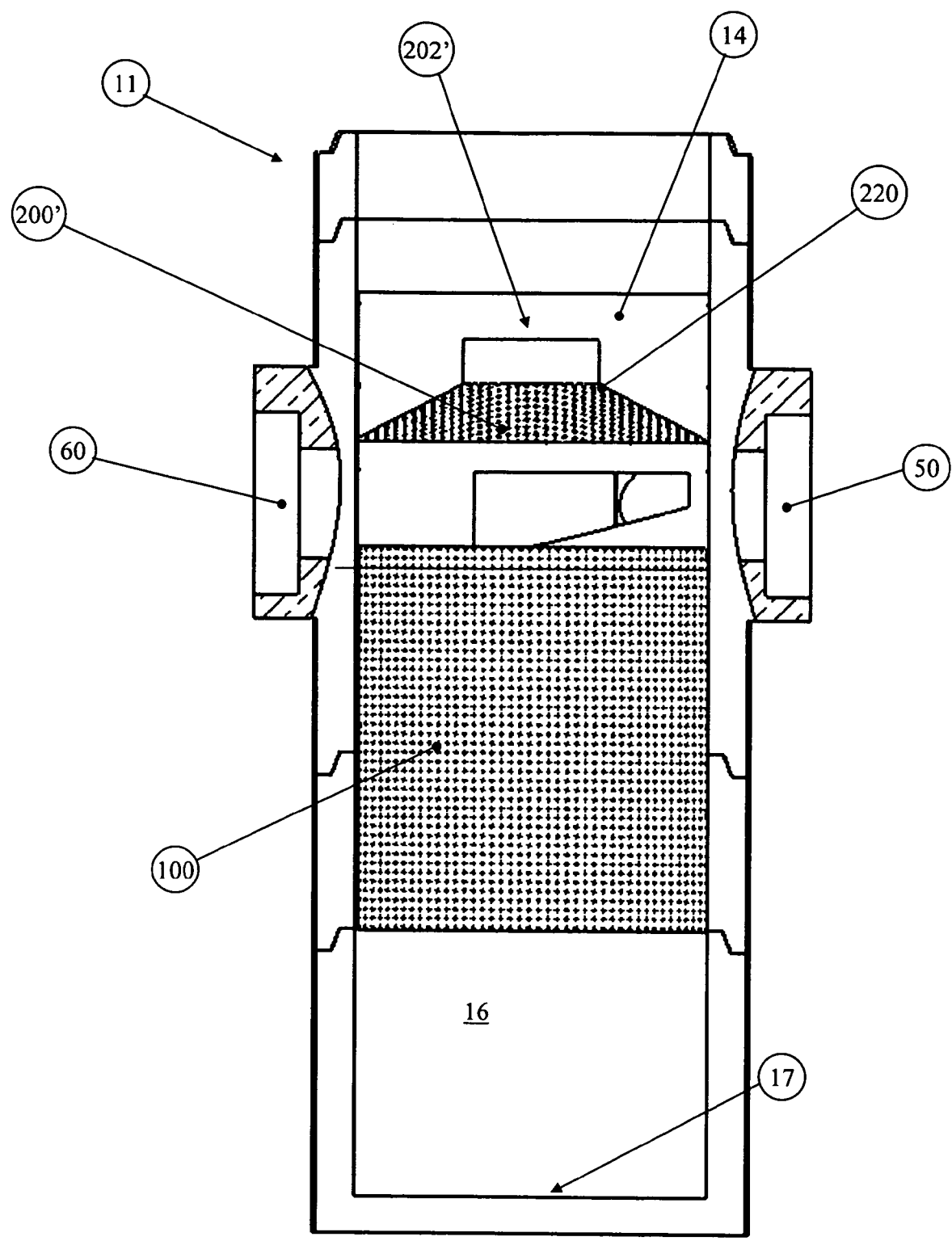
FIG. 8B is a cross-sectional elevation view of the embodiment of 8A.

In an alternative embodiment of the second screen 200' shown in FIGS. 8A and 8B, the second screen 200' is configured to direct floating particulates toward a second screen port 202', effectively replacing the diverting function of the collection weir system 201. Specifically, the second screen 200' is conical in shape, and preferably a truncated cone shape. The second screen 200' includes a second screen port 202' that is shown substantially centered in the space between the interior side 20 of the tank 11 and the interior sidewall of the baffle 14, but may alternatively be positioned off center. A screen apex 220 of the second screen 200' is preferably positioned farthest above the resting fluid surface. The preferred conical shape of the second screen 200' directs floating particulates toward the second screen port 202' as the fluid elevation rises. When the fluid surface exceeds the top of the second screen port 202', any floating particulates therein spill over above the second screen 200' and remain thereon as the fluid recedes.

Figure 9:
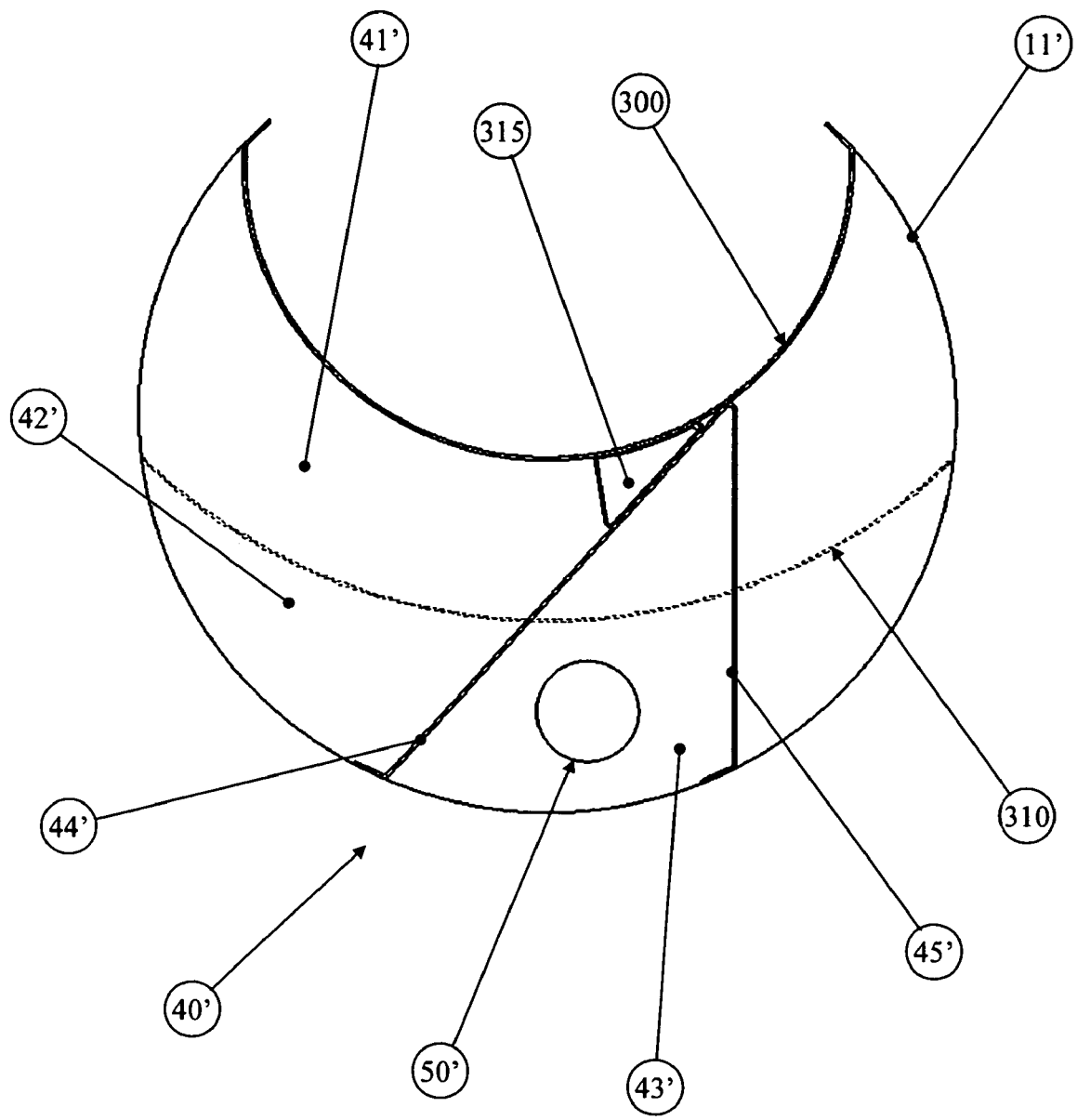
FIG. 9 is a plan view of an alternative embodiment of the separation system of the present invention, showing the upper baffle and the lower baffle in an arrangement to enable high fluid flow bypass.
Figure 10:
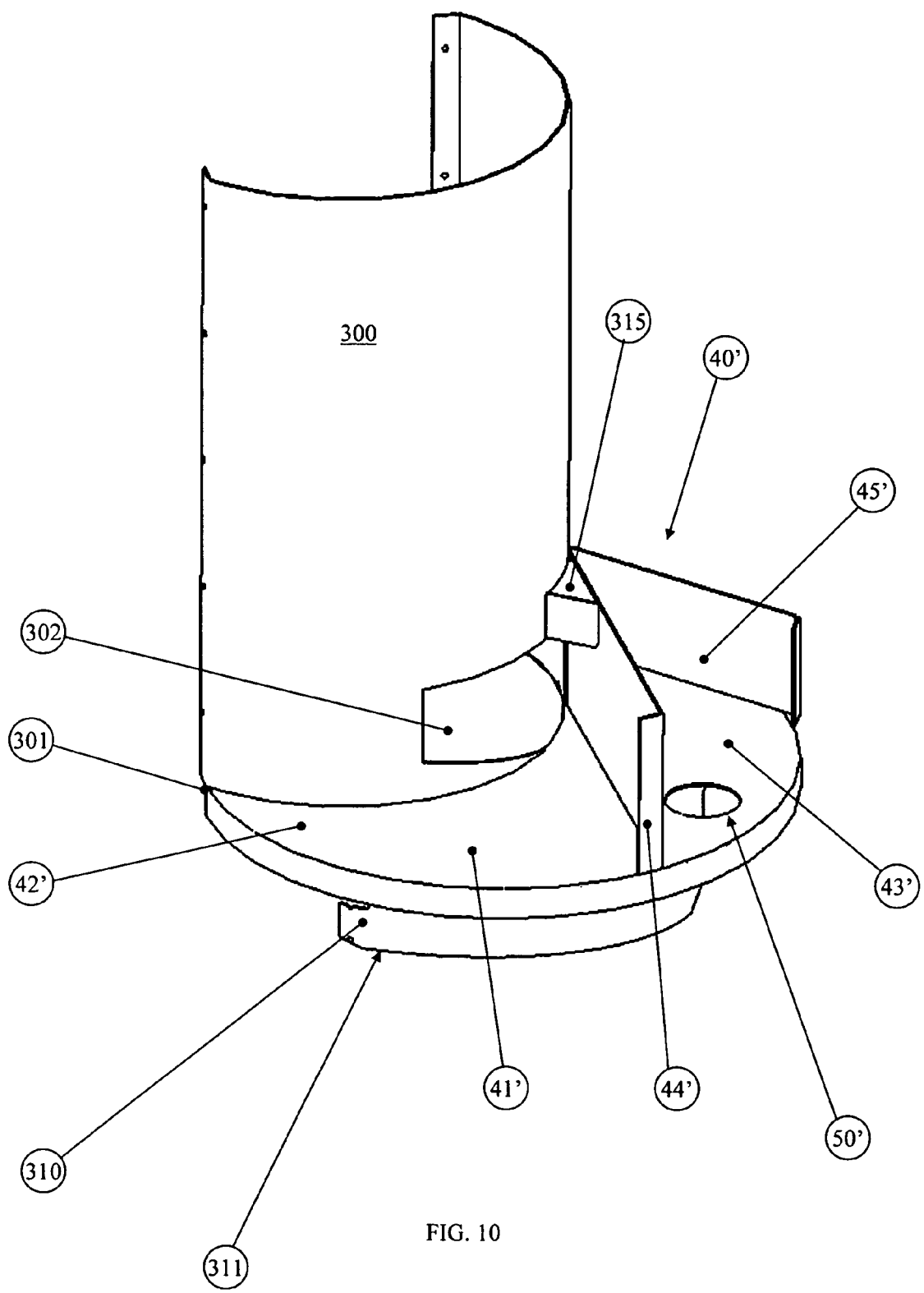
FIG. 10 is a perspective view of the alternative combination of the upper baffle and lower baffle, showing the bypass portion of the separation system.

A first alternative embodiment of the fluid diversion and bypass portion comprising the baffle arrangement and the bypass of the separation system 10 is shown in FIGS. 9 and 10. This first alternative embodiment includes an upper baffle 300 and a lower baffle 310 positionable within the tank 11 shown in the other figures. The tank 11 remains configured to separate particulates from a fluid entering the storage chamber 16 in the manner previously described. A tank including the alternative arrangement of FIGS. 9 and 10 continues to function as a means to separate particulates from a fluid entering the tank, however, the alternative arrangement enables a greater volume of fluid to bypass the tank storage chamber, such as storage chamber 16, under relatively high flow conditions. The upper baffle 300 is preferably spaced further from the tank interior side, but at smaller radius of curvature than the baffle 14 of FIG. 2, for example. The radius of curvature is preferably maintained to be greater than or equal to approximately half the radius of curvature of the tank. This arrangement allows a greater volume of fluid to bypass the tank storage chamber while simultaneously maintaining the development of separationenhancing swirling patterns in the storage chamber. That is, the combination of the upper baffle 300 and the lower baffle 310 baffle continues to isolate the storage chamber from the bypass in the manner previously described. Systems incorporating an upper baffle with a radius of curvature smaller that one half the radius of curvature of the tank, for example, can have little or no development of swirling flow in the storage chamber resulting in poor separation performance. The upper baffle 300 is spaced from the interior side by bypass flow control system 40'. The upper baffle 300 includes a bottom 301 that is approximately at the level of the bottom of the bypass flow control system 40'. The lower baffle 310 is spaced more closely to the tank interior side than the upper baffle, but below the bypass flow control system 40' and at a radius of curvature more closely matching the interior dimensions of the tank within which the baffle and bypass are positioned. The lower baffle 310 includes a bottom 311 arranged to be spaced above the bottom of the tank.

The bypass flow control system 40' includes a bypass plate 41', an inlet flow control zone 42', an outlet flow control zone 43', a weir 44', a head equalization baffle 45', and an outlet port 50'. The dimensions of the bypass plate 41' define the displacement of the upper baffle 300 from the interior side of the tank. The upper baffle 300 includes an upper baffle port 302 through which fluid entering the tank passes from the inlet flow control zone 42' into the tank storage chamber. The weir 44' diverts fluid through the baffle port 302 into the tank storage chamber. Treated fluid within the storage chamber passes behind the lower baffle 310 and into the outlet flow control zone 43' through the outlet port 50'. As the fluid entering the tank 11 reaches a relatively high flow rate, the baffle port 302 becomes fully submerged, with a portion of the fluid diverted through the baffle port 302 while the balance spills over the weir 44', bypassing the treatment provided by the storage chamber. Particulates in the fluid entering the storage chamber through the baffle port 302 continue to be treated as before, with floating particulates retained in the upper portion of the storage chamber by the upper baffle 300 and, to an extent, the lower baffle 310, and nonfloating particulates retained in the bottom of the tank. The head equalization baffle 45' moderates the flow rate through the storage chamber when flow over weir 44' occurs. Low flows passing only through the baffle port 302 are allowed to freely discharge through outlet port 50' and underneath the head equalization baffle 45'. However, as flow crests the weir 44' and enters the area above outlet port 50', the additional flow is restricted by the head equalization baffle 45' and begins to rapidly submerge the outlet port 50'. This pooling of fluid creates an additional resistance to flow through the outlet port 50'. This arrangement results in a relatively consistent flow rate through the storage chamber even as flow through the entire system increases. When the fluid level in the outlet flow control zone 43' rises above the level of the head equalization baffle 45', it spills over and exits the tank. The top of the head equalization baffle 45' is preferably at a level equal to or higher than the top of the weir 44'.

The portion of the separation system shown in FIGS. 9 and 10 may further include a wedge 315 positioned between the weir 44' and the back side of the baffle 300 at about the crown of the baffle port 302 at the weir 44' to baffle 300 interface. The wedge 315 is configured and arranged to prevent particulates from becoming wedged into the space occupied by the wedge 315. When the wedge 315 is not placed in what is effectively a dead space, particulates, and floating particulates specifically transported by relatively high fluid flows to and over the weir 44', become entrapped in that space and disrupt fluid flow. The wedge 315 is preferably shaped to conform to the dimensions of the space between the baffle 300 and the weir 44'. The use of the wedge 315 is not limited to deployment in a separation system for relatively high fluid bypass such as the system represented in FIGS. 9 and 10. It may also be used in any separation system in which a baffle with port and fluid bypass behind the baffle are used.

Figure 11:
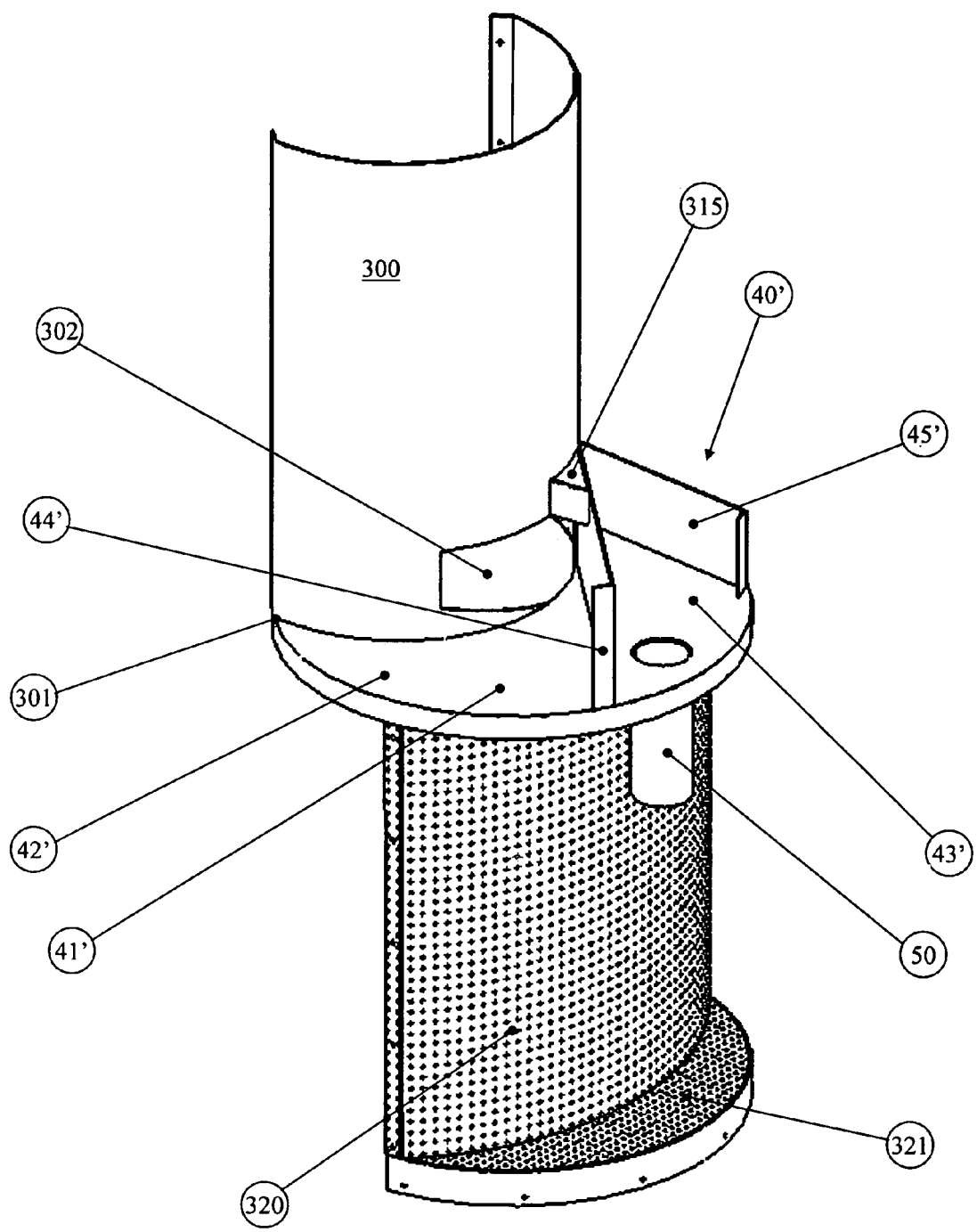
FIG. 11 is a perspective view of an alternative embodiment of the separation system of the present invention, showing a baffle and screen combination in an arrangement to enable high fluid flow bypass.

A second alternative embodiment of the fluid diversion and bypass portion of the system of the present invention is shown in FIG. 11. The second alternative embodiment is similar to the first alternative embodiment shown in FIGS. 9 and 10 as it is intended to provide for high fluid volume bypass when needed and as compared to the arrangement of the separation system 10 shown in FIG. 2. It is also similar to the first embodiment of FIGS. 9 and 10 in that baffle 300 remains in use; however, the lower baffle 310 is replaced by screen 320. The screen 320 is positioned below bypass plate 41' and is attachable to the interior side of the tank and or the underside of the bypass plate 41'. The screen 320 extends downwardly into the lower portion of the tank storage chamber from the bypass plate 41', whereas the bottom of the upper baffle 300 substantially terminates at the bypass plate 41'. The radius of curvature of the screen 320 is greater than the radius of curvature of the baffle 300 in this alternative embodiment of the fluid diversion and bypass portion of the separation system.

As earlier noted, when a screen forms part of the separation system, and that screen is positioned within the tank at or below the level of the bypass flow control system 40' (or 40 for the first embodiment of the separation system 10), the outlet tube 50 is preferred over the outlet port 50' as the storage chamber outlet so that any floating particulates that pass through the screen 320 (or screen 100) remain trapped under the bypass plate 41' (or bypass plate 41). When a solid structure such as the lower baffle 310 of FIGS. 9 and 10 is used instead of the screen 100 or screen 320, such floating particulates are blocked by that structure and the outlet tube 50 is not required, and the outlet port 50' may be used instead.

A bottom portion of the screen 320 includes screen extension 321 extending from the screen 320 back to the interior side of the tank behind the screen 320, substantially as shown in FIG. 2 regarding screen 100 and screen extension 106. The screen extension 321 prevents particulates such as neutrally-buoyant particulates from passing up behind the screen 320 to the tank outlet via outlet tube 50. The screen extension 321 may be made of the same material as is the main body of the screen 320. The screen extension 321 is preferably configured to allow any relatively small particulates that may be located behind the baffle 300 to pass therethrough and fall to the bottom of the tank storage chamber. The screen 320 and the screen extension 321 are preferably configured and arranged to aid in the separation of neutrally buoyant particulates from the fluid in the storage chamber. The second alternative embodiment of the portion of the separation system as shown in FIG. 11 may further include the wedge 315 described above.

While the present invention has been described with particular reference to certain embodiments of the screening systems, it is to be understood that it includes all reasonable equivalents thereof as defined by the following appended claims.

What is claimed is:

1. An apparatus for separating particulates from a fluid, the apparatus comprising:
   a) a substantially cylindrical tank having a bottom and interior sidewalls to define a storage chamber, an inlet at a first location on the interior sidewalls for receiving the fluid, and an outlet at a second location on the interior sidewalls for transferring the fluid out of the tank;
   b) a curved baffle positioned within the tank and having a lower portion including a bottom, wherein the bottom of the baffle is spaced above the bottom of the tank; and
   c) a curved screen positioned within the tank and extending from the baffle into a lower portion of the storage chamber.

2. The apparatus as claimed in claim 1 wherein the screen is fabricated of perforated metal.

3. The apparatus as claimed in claim 1 wherein a portion of the screen is porous and a portion is non-porous.

4. The apparatus as claimed in claim 3 wherein the screen includes a leading edge that is non-porous.

5. The apparatus as claimed in claim 1 wherein when the tank is in use to treat the fluid, the baffle and the screen are substantially vertically oriented.

6. The apparatus as claimed in claim 5 further comprising a second screen spaced above the substantially vertically oriented screen, wherein the second screen is substantially horizontally oriented and positioned above the expected resting fluid surface in the tank.

7. The apparatus as claimed in claim 6 further comprising a collection weir, wherein the second screen is removably affixed to the collection weir.

8. The apparatus as claimed in claim 7 wherein the collection weir includes a frame upper section extending above the second screen, the frame upper section and the second screen including a port through which fluid from the storage chamber passes before passing onto the second screen.

9. The apparatus as claimed in claim 8 wherein the collection weir further includes a frame lower section extending below the second screen.

10. The apparatus as claimed in claim 6 wherein a bottom surface of the second screen is disposed above a crown of the tank inlet.

11. The apparatus as claimed in claim 1 further comprising a screen extension extending from behind the screen toward the interior sidewalls of the tank.

12. An apparatus for separating particulates from a fluid, the apparatus comprising:
   a) a tank having a bottom and interior sidewalls to define a storage chamber, an inlet at a first location on the interior sidewalls for receiving the fluid, and an outlet at a second location on the interior sidewalls for transferring the fluid out of the tank;
   b) a baffle having a bottom, a first side baffle wall, a second side baffle wall and a port, wherein the baffle is positioned within the tank, the bottom of the baffle spaced above the bottom of the tank;
   c) a screen extending from the baffle into a lower portion of the storage chamber;
   d) a bypass including an inlet flow control means on the second side baffle wall between the inlet and the port of the baffle; and
   e) a weir positioned to divert fluid from the inlet to the baffle port under relatively low fluid flows and, under relatively high fluid flows, to divert one portion of the fluid from the inlet to the baffle port while allowing the remaining portion of the fluid to flow from the inlet to the outlet without entering the storage chamber through the baffle port.

13. The apparatus as claimed in claim 12 wherein the screen is fabricated of perforated metal.

14. The apparatus as claimed in claim 12 wherein a portion of the screen is porous and a portion is non-porous.

15. The apparatus as claimed in claim 14 wherein the screen includes a leading edge that is non-porous.

16. The apparatus as claimed in claim 12 wherein when the tank is in use to treat the fluid, the baffle and the screen are substantially vertically oriented.

17. The apparatus as claimed in claim 16 further comprising a second screen spaced above the substantially vertically oriented screen, wherein the second screen is substantially horizontally oriented and positioned above the expected resting fluid surface in the tank.

18. The apparatus as claimed in claim 17 further comprising a collection weir, wherein the second screen is affixed to the collection weir.

19. The apparatus as claimed in claim 18 wherein the collection weir includes a frame upper section extending above the second screen, the frame upper section and the second screen including a port through which fluid from the storage chamber passes before passing onto the second screen.

20. The apparatus as claimed in claim 19 wherein the collection weir further includes a frame lower section extending below the second screen.

21. The apparatus as claimed in claim 17 wherein a bottom surface of the second screen is disposed above a crown of the tank inlet.

22. The apparatus as claimed in claim 12 further comprising a wedge between the baffle and the weir adjacent to the baffle port.

23. An apparatus to improve the separation of particulates from a fluid passing into a separation tank including an inlet, an outlet, and an arrangement for diverting at least a portion of the fluid from the inlet into the tank prior to the fluid exiting via the outlet, the apparatus comprising a screen affixable to the arrangement for diverting, the screen arranged substantially vertically in the separation tank and having a bottom edge that is spaced above a bottom wall of the separation tank, the screen configured to filter out relatively large particulates from the diverted fluid prior to the fluid exiting the tank via the outlet, the screen further configured to minimize the inhibition of fluid flow from the tank to the outlet.

24. The apparatus as claimed in claim 23 wherein the screen is fabricated of perforated metal.

25. The apparatus as claimed in claim 23 wherein a portion of the screen is porous and a portion is non-porous.

26. The apparatus as claimed in claim 25 wherein the screen includes a leading edge that is non-porous.

27. The apparatus as claimed in claim 23 wherein when the tank is in use to treat the fluid, the arrangement for diverting and the screen are substantially vertically oriented.

28. The apparatus as claimed in claim 27 further comprising a second screen spaced above the substantially vertically oriented screen, wherein the second screen is substantially horizontally oriented and positioned above the expected resting fluid surface in the tank.

29. The apparatus as claimed in claim 28 further comprising a collection weir, wherein the second screen is affixed to the collection weir.

30. The apparatus as claimed in claim 29 wherein the collection weir includes a frame upper section extending above the second screen, the frame upper section and the second screen including a port through which fluid from the tank passes before passing onto the second screen.

31. The apparatus as claimed in claim 30 wherein the collection weir further includes a frame lower section extending below the second screen.

32. The apparatus as claimed in claim 28 wherein a bottom surface of the second screen is disposed above a crown of the tank inlet.

33. An apparatus to improve the separation of particulates from a fluid passing into a separation tank including an inlet, an outlet, and an arrangement for diverting at least a portion of the fluid from the inlet into the tank prior to the fluid exiting via the outlet, the apparatus comprising a screen affixable in the separation tank in a substantially horizontal orientation, wherein a bottom surface of the screen is positioned above a crown of the inlet of the tank and is arranged to isolate a portion of the particulates within the tank from the arrangement for diverting.

34. The apparatus as claimed in claim 33 further comprising a collection weir, wherein the screen is affixed to the collection weir.

35. The apparatus as claimed in claim 34 wherein the collection weir includes a frame upper section extending above the screen, the frame upper section and the screen including a port through which fluid from the tank passes before passing onto the screen.

36. The apparatus as claimed in claim 35 wherein the collection weir further includes a frame lower section extending below the second screen.

37. The apparatus as claimed in claim 33 wherein a bottom surface of the screen is disposed above a crown of the tank inlet.

38. An apparatus to improve the separation of particulates from a fluid passing into a separation tank including an inlet, an outlet, and an arrangement for diverting at least a portion of the fluid from the inlet into the tank prior to the fluid exiting via the outlet, the apparatus comprising a screen affixable in the separation tank positioned substantially above the expected resting fluid surface in the tank and arranged to isolate a portion of the particulates within the tank from the arrangement for diverting, wherein the screen is further positioned to retain thereon particulates carried by the fluid above the resting fluid surface when the fluid recedes to or below the resting fluid surface, wherein the screen includes a port configured to allow particulates to pass therethrough as the fluid level within the tank rises above the level of the screen.

39. The apparatus as claimed in claim 38 wherein the screen is of conical shape, with the apex of the conical shape the portion of the screen positioned farthest from a bottom of the tank.

40. The apparatus as claimed in claim 38 wherein a bottom surface of the screen is disposed above a crown of the tank inlet.

41. A separation system for separating floating and non-floating particulates from a fluid, the system comprising:
a) a tank having a bottom and interior sidewalls to define a storage chamber, an inlet at a first location on the interior sidewalls for receiving the fluid, and an outlet at a second location on the interior sidewalls for transferring the fluid out of the tank;
b) an upper baffle spaced from the interior sidewalls of the tank and having an upper baffle bottom and an upper baffle port to allow fluid entering the tank to pass from behind the upper baffle into the storage chamber;
c) a bypass including an inlet flow control means for controlling fluid flow from the inlet through the upper baffle port, the bypass spaced between the upper baffle and the tank interior sidewalls;
d) a lower baffle having a lower baffle bottom spaced above the bottom of the tank, wherein the lower baffle is positioned within the tank below the level of the upper baffle; and
e) a weir positioned between the inlet flow control means and the outlet, the weir configured to divert fluid from the inlet to the upper baffle port under relatively low fluid flows and to divert one portion of the fluid from the inlet to the upper baffle port and to allow the remaining portion of the fluid to flow from the inlet to the outlet under relatively high fluid flows.

42. The apparatus as claimed in claim 41 wherein the bypass includes a bypass plate.

43. The apparatus as claimed in claim 42 wherein the upper baffle bottom of the upper baffle is positioned at substantially the same level as the bypass plate.

44. The apparatus as claimed in claim 42 wherein the bypass further includes an outlet port through the bypass plate, wherein the outlet port provides fluid communication between the storage chamber and the tank outlet.

45. The apparatus as claimed in claim 42 wherein the bypass further includes a head equalization baffle positioned behind the upper baffle.

46. The apparatus as claimed in claim 45 wherein the head equalization baffle includes atop, wherein the top of the head equalization baffle is at or above the height of the weir.

47. The apparatus as claimed in claim 41 further comprising a wedge positioned between the upper baffle and the weir adjacent to the baffle port.

48. An apparatus for separating particulates from a fluid, the apparatus comprising:
a) a tank having a bottom and interior sidewalls to define a storage chamber, an inlet at a first location on the interior sidewalls for receiving the fluid, and an outlet at a second location on the interior sidewalls for transferring the fluid out of the tank;
b) a baffle having a bottom, a first side baffle wall, a second side baffle wall and a port, wherein the baffle is positioned within the tank, the bottom of the baffle spaced above the bottom of the tank;
c) a bypass including an inlet flow control means on the second side baffle wall between the inlet and the port of the baffle;
d) a screen extending from the bypass into the storage chamber; and
e) a weir positioned to divert fluid from the inlet to the baffle port under relatively low fluid flows and, under relatively high fluid flows, to divert one portion of the fluid from the inlet to the baffle port while allowing the remaining portion of the fluid to flow from the inlet to the outlet without entering the storage chamber through the baffle port.

49. The apparatus as claimed in claim 48 wherein the bypass includes a bypass plate.

50. The apparatus as claimed in claim 49 wherein the baffle bottom of the baffle is positioned at substantially the same level as the bypass plate.

51. The apparatus as claimed in claim 49 wherein the bypass further includes an outlet tube passing through and extending below the bypass plate, wherein the outlet tube provides fluid communication between the storage chamber and the tank outlet.

52. The apparatus as claimed in claim 49 wherein the bypass further includes a head equalization baffle positioned behind the baffle.

53. The apparatus as claimed in claim 52 wherein the head equalization baffle includes atop, wherein the top of the head equalization baffle is at or above the height of the weir.

54. The apparatus as claimed in claim 48 further comprising a wedge positioned between the baffle and the weir adjacent to the baffle port.

* * * * *

UNITED STATES PATENT AND TRADEMARK OFFICE
CERTIFICATE OF CORRECTION

PATENT NO. : 7,297,266 B2 Page 1 of 1
APPLICATION NO. : 11/017415
DATED : November 20, 2007
INVENTOR(S) : Daniel P. Cobb et al.

It is certified that error appears in the above-identified patent and that said Letters Patent is hereby corrected as shown below:

Claim 46, Column 16, Line 29 replace "atop" with --a top--

Claim 53, Column 17, Line 5 replace "atop" with --a top--

Signed and Sealed this

Third Day of June, 2008

JON W. DUDAS
*Director of the United States Patent and Trademark Office*